Figure 1:
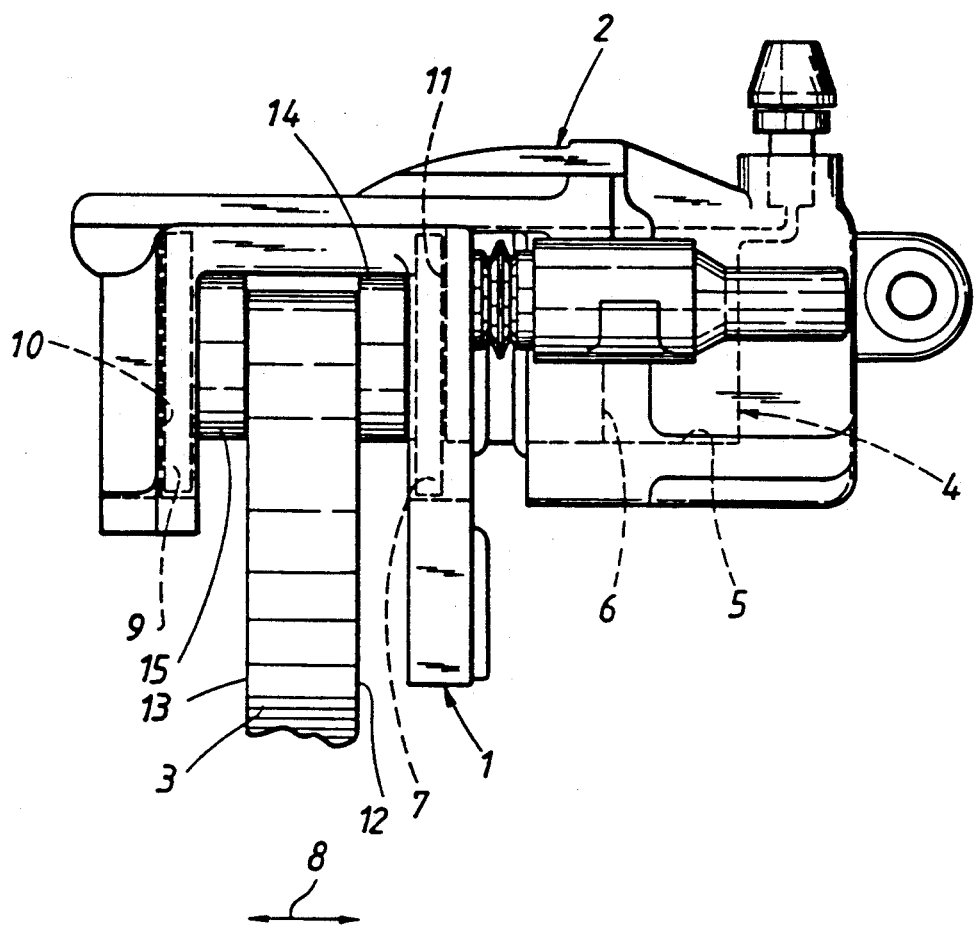

United States Patent [19]
Kleiva

[11] Patent Number: 5,083,641
[45] Date of Patent: Jan. 28, 1992

[54] DISC BRAKE ARRANGEMENT

[75] Inventor: Gunnar Kleiva, Göteborg, Sweden

[73] Assignee: Aktiebolaget Volvo, Sweden

[21] Appl. No.: 728,754

[22] Filed: Jul. 8, 1991

Related U.S. Application Data

[63] Continuation of Ser. No. 472,623, Jan. 30, 1990, abandoned.

[30] Foreign Application Priority Data

Feb. 10, 1989 [SE] Sweden ............................ 8900451

[51] Int. Cl.⁵ .......................................... F16D 55/225
[52] U.S. Cl. .............................. 188/73.39; 188/250 B
[58] Field of Search .................. 188/71.1, 73.1, 73.31, 188/73.39, 73.43, 73.44, 73.45, 73.47, 250 B

[56] References Cited

U.S. PATENT DOCUMENTS

| | | | |
|---|---|---|---|
| 3,831,717 | 8/1974 | Flaherty | 188/73.43 |
| 4,341,289 | 7/1982 | Smith | 188/73.45 X |
| 4,632,227 | 12/1986 | Mary et al. | 188/73.39 X |

FOREIGN PATENT DOCUMENTS

| | | | |
|---|---|---|---|
| 0326774 | 8/1989 | European Pat. Off. | |
| 2535201 | 2/1977 | Fed. Rep. of Germany | |
| 2832443 | 2/1989 | Fed. Rep. of Germany | |
| 2146398 | 4/1985 | United Kingdom | 188/73.45 |
| 8100605 | 3/1981 | World Int. Prop. O. | 188/73.45 |

*Primary Examiner*—George E. A. Halvosa
*Attorney, Agent, or Firm*—Lerner, David, Littenberg, Krumholz & Mentlik

[57] ABSTRACT

Arrangement for disc brakes having so-called floating suspension containing a brake disc and a brake caliper which is movably mounted on a caliper holder for axial motions relative to the brake disc. The brake caliper has at least one pair of brake pads having friction linings intended to be brought to bear against braking surfaces on the brake disc. Load-bearing supporting surfaces hold the brake pads normally in their intended positions in the caliper by absorbing the forces acting mainly on the brake pads due to friction against the brake disc by cooperating with edge surfaces on the brake pads. These supporting surfaces extend over only a part of the space up to the brake disc to an imaginary geometrical delimiting plane for each brake pad, said plane extending parallel to the brake disc. The brake pads have protrusions, each of which extend into an opening in the caliper or caliper holder, one opening being provided for each protrusion. The protrusions normally maintain no load-absorbing cooperation with the caliper or caliper holder but rather have normally a play between parts of the protrusions and the corresponding openings. The openings extend axially closer to the brake disc than the supporting surfaces so that when the brake pads and brake disc are worn down to such a degree that the brake pads can move axially beyond the delimiting plane for the supporting surfaces, said parts of the protrusions are caused during braking, by contacting reserve supporting surfaces in the openings, to absorb the forces acting on the brake pads due to friction against the brake disc.

4 Claims, 3 Drawing Sheets

DISC BRAKE ARRANGEMENT

This is a continuation of application Ser. No. 07/472,623 filed Jan. 30, 1990, now abandoned.

The present invention relates to a disc brake arrangement including a brake disc, provided for rotation about an axle, and at least one brake caliper which is movably mounted on a caliper holder for axial movement relative to the brake disc, said brake caliper carrying at least one pair of brake pads having friction linings intended to be brought to bear against brake surfaces on the brake disc, whereby one brake pad is disposed on either side of the brake disc, and at least one hydraulic piston/-cylinder unit whose piston is provided to press the one brake pad against the one side of the brake disc during braking by means of direct force and thereby by moving the caliper in the caliper holder also to exert a pressing force via the caliper on the other brake pad in the direction towards the opposing side of the brake disc, whereby each of the brake pads is moveable in a corresponding space delimited by the caliper and the caliper holder, which are opened in the radial direction inwardly or outwardly in order to enable mounting and demounting of the brake pads, the spaces further having load-bearing supporting surfaces which normally hold the lining discs in their intended positions in the caliper by absorbing mainly the forces acting on the brake pads due to friction against the brake disc by cooperating with edge surfaces on the brake pads, which supporting surfaces extend over only a part of said space to the brake disc to an imaginary geometrical delimiting plane for each brake disc, which plane extends parallel to the brake disc.

In order to reduce the need for space of disc brakes it is previously known to arrange the caliper contained in the disc brake to be glideable relative to a caliper holder, which carries the caliper. Unlike the prior art, it is thereby not necessary to provide separate hydraulic pistons for each of the brake pads on both sides of the brake disc, but instead only on its one side, since the opposing brake pad is pressed against the brake disc by the gliding of the caliper due to the direct pressure by the piston or pistons on the one brake pad against the one side of the brake disc. The slot between the brake disc and the caliper holder is substantially less than the thickness of the brake pads, whereby the brake pads, which are loose relative to the caliper and the caliper holder, are normally not able to fall out of the caliper. When the brake pads and the discs are greatly worn down, there is however a certain danger that the brake pad will fall out, whereupon the piston or pistons will press directly against the brake disc when braking. The additional danger thereby arises that the piston or pistons will be pressed outwards so far, that they fall out of the respective brake cylinder, whereupon all braking action in the corresponding brake circuit will cease.

The object of the present invention is to eliminate the above mentioned disadvantage and to provide a disc brake arrangement, in which there is no danger of the brake pads falling out of the caliper.

The stated object is achieved by means of an arrangement in accordance with the invention, which is characterized therein that the brake pads have protrusions, provided to extend into an opening in the caliper or caliper holder for each protrusion, said protrusions being provided normally not to maintain any load-bearing cooperation with the caliper or caliper holder but rather normally having a play between parts of the protrusions and the corresponding openings, said openings extending axially closer to the brake disc than the said supporting surfaces so that, in the presence of such wear on the brake pads and the brake disc, that the brake pads can be moved axially outside of said delimiting plane for the supporting surfaces, said parts of the protrusions are during braking brought by means of coming to bear against reserve support surfaces in said openings to absorb the forces acting on the brake pads due to friction against the brake disc, in addition to which said opening has at least one reserve supporting surface which extends peripheraly outside of and bridges the brake disc, and said protrusions are two in number per brake pad and each have an edge portion which edge portions mutually diverge in the direction away from the axle of the brake disc, said edge portion normally being disposed at a, space from said reserve supporting surface in each of said openings, said reserve supporting surfaces likewise mutually diverging from said axle.

Figure 2:
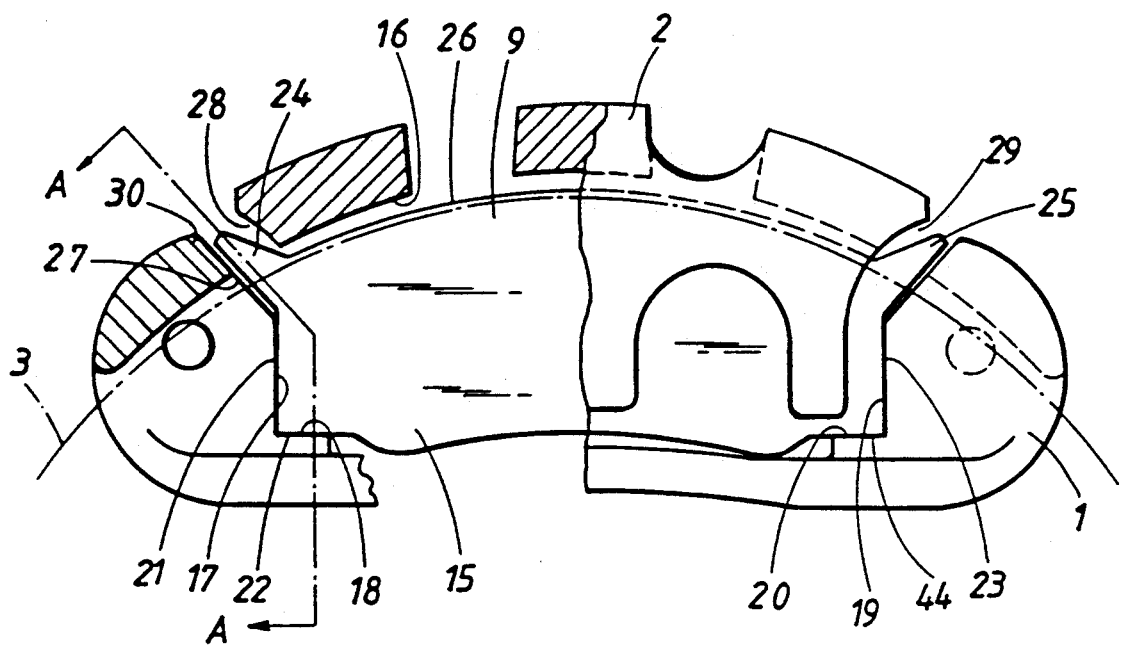
Figure 3:
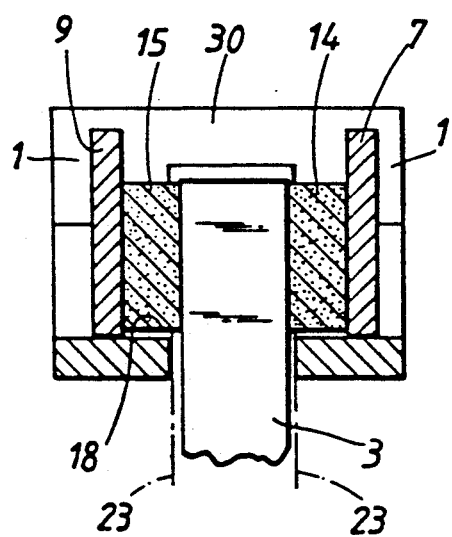
Figure 4:
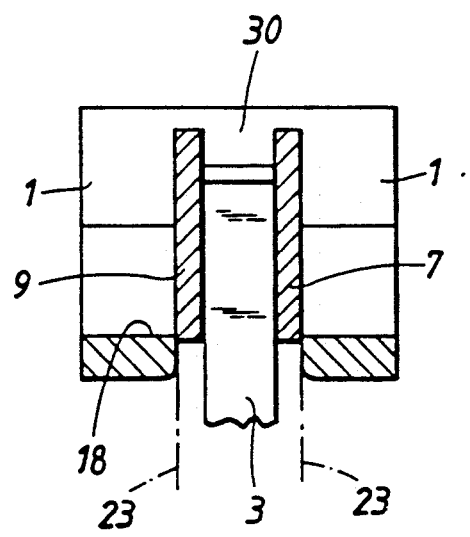
Figure 5:
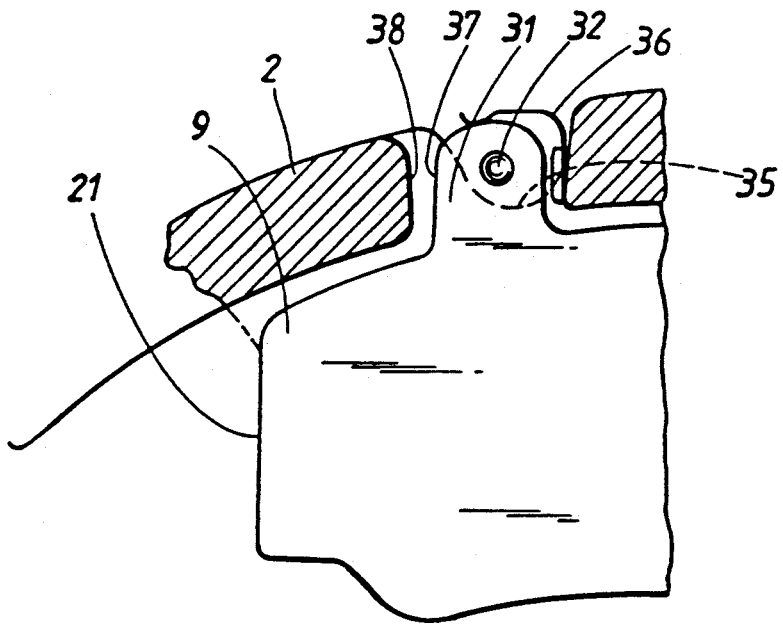
Figure 6:
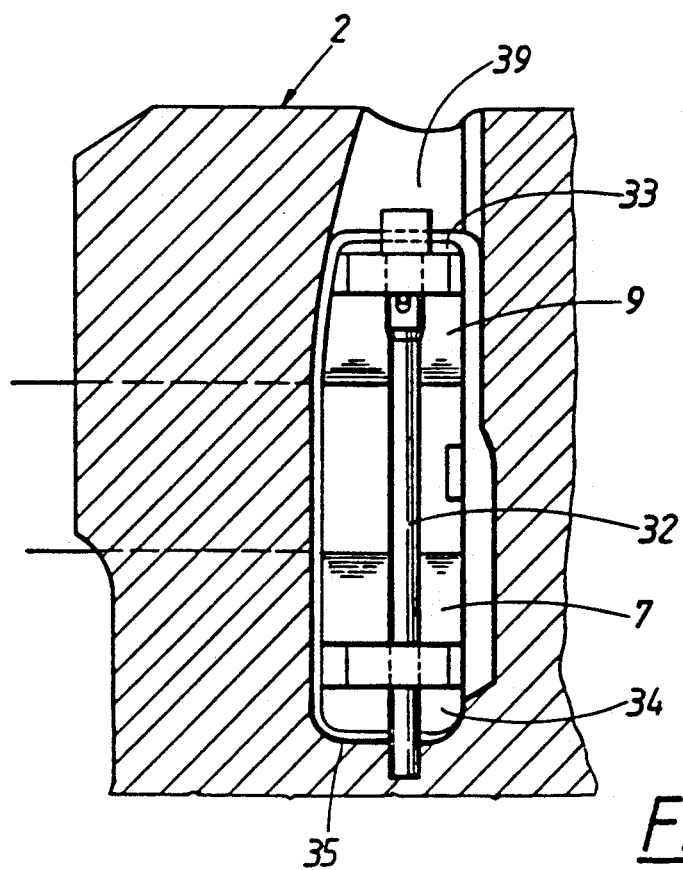

The invention will now be described in greater detail with a pair of exemplifying embodiments with reference to the accompanying drawings, in which FIG. 1 is an end view of a disc brake of the relevant type, for which the arrangement according to the invention is intended, FIG. 2 is a partially broken schematic section showing the arrangement according to the invention, FIGS. 3 and 4 show respectively sections through the disc brake according to FIG. 2 taken along the line A-A in FIG. 2 in two different positions of deterioration, FIGS. 5 and 6 show respectively a partially broken section and a partially broken view from above of a second embodiment of the arrangement according to the invention.

As is best seen in FIGS. 1 and 2, the disc brake of the relevant type having a gliding caliper contains a caliper holder 1, which is mounted on a chassis, frame or the like, and a caliper 2 which is carried by the caliper holder, and which is arranged so as to be displaceable relative to the caliper holder. A brake disc 3, whose periphery is partially indicated by the dash-dotted line, is also included. The brake disc 3 is for example mounted on a hub, intended for securing a vehicle wheel, which is intended to rotate together with or relative to an axle, and which is mounted on a vehicle chassis and is intended to be braked by means of the disc brake. As is indicated in FIG. 1 using dashed lines, the caliper encloses parts of the hydraulics, which bring about activation of the disc brake. One or more piston-cylinder units 4 are namely built into the caliper, and are preferably two in number in the illustrated example. The piston-cylinder units 4 consist of a cylinder chamber 5 and a piston which is moveable in the chamber with the required piston sealing. Under the influence of hydraulic fluid pressure, which is generated in a conventional manner for example via a servo system when for example a driver depresses a brake pedal, the piston is arranged to move in the direction out of the cylinder chamber 5 and is thereby arranged by means of a bearing surface to press a brake pad 7 contained in the disc brake against one side of the brake disc 3.

As was initially mentioned, the caliper 2 is slidably mounted relative to the caliper holder 1. In the illustrated example, this is arranged by having the caliper 2 being carried by two guide rods, which extend with a good fit through two channels in the caliper and which are securely mounted in the caliper holder. In this way the caliper glides easily relative to the caliper holder in the axial direction 8, which is marked in FIG. 1 using a double-ended arrow 8. A second, opposing brake pad 9 is carried by the caliper 2, whereby this opposing brake pad 9 is thus located on the opposite side of the brake disc 3. As was mentioned initially, the disc brake is of the type which, for reasons of space, has a single-sided hydraulic system, i.e., there are no piston units on the opposite side of the caliper, so that the corresponding brake pad 9 is loosely mounted in a space in the caliper and bears against a bearing surface 10, which replaces the bearing surface 11 of the piston in the piston/cylinder units. Because of the ability of the caliper to glide, activation of the piston/cylinder units causes however a mainly evenly distributed bearing pressure on both sides of the brake disc, i.e., on both of its braking surfaces 12, 13. The bearing of the pistons/cylinder units against the one brake pad with the corresponding brake lining 14 against the braking surface 12 of the brake disc causes the brake caliper to move in the opposite direction, whereupon the bearing surface 10 on the opposing side is pushed forward so that the brake lining 15 of the opposing brake pad 9 is pressed against the braking surface 13 of the brake disc in such a way that mainly symmetrical force application is achieved despite a one-sided primary force effect.

In the partially broken view according to FIG. 2, the one brake pad 9 is shown located in a space 16, which is defined by surfaces which are partially in the caliper holder 1 and partially in the caliper 2. On either side of the brake disc, the caliper holder 1 has supporting surfaces 17, 18, 19, 20, which are load-bearing and thereby bear the forces on the brake pads due to friction against the brake disc, which forces may be relatively large during braking. These supporting surfaces 17-20 form gliding surfaces relative to which the brake pads 7, 9, with the corresponding edge surface 21, 22, 23, 24 on the brake pads 7, 9 may glide during the braking motion.

The above mentioned supporting surfaces 17-20 have an extension which is best shown by the wholly schematically shown views of FIGS. 3 and 4. Naturally, the supporting surfaces must have a certain distance to the braking surfaces of the brake disc and, in the illustrated example, extend to the planes 23 indicated with dash-dotted lines.

According to the invention, the brake pads 7, 9 have protrusions 24, 25 as is shown in FIG. 2, and in the illustrated example there are two such protrusions per brake pad. The protrusions are arranged in the backing plate 26 of the brake pads, with the backing plate carrying corresponding linings 15 and which is suitably made of a durable, rigid material such as steel plate. In the illustrated example, the protrusions 24, 25 are angled so that they diverge outwardly from the axes of rotation of the brake disc and have an edge portion 27 which forms an obtuse angle with the edge surface 21. In the illustrated example, the protrusions 24, 25 have the shape of a beak and extend into respective openings 28, 29 which are arranged in an intermediate space between the caliper holder and the caliper. In each opening, the caliper holder has a reserve supporting surface 30, which in the illustrated example extends parallel to the edge portion 27 and is directed in such a way that the two reserve supporting surfaces, as well as the edge portions in each brake pad, diverge from one another, viewed in the direction away from the axes of rotation. The reserve supporting surface is normally located at a slight distance from the edge portion so that some play is normally maintained between these two surfaces at each protrusion. The protrusions 24, 25 are thereby not exposed to the forces which arise during braking, so that there is no danger of unnecessary friction and binding, which may cause jamming and thereby unnecessary wear of the lining and the brake disc.

As is seen in FIGS. 3 and 4, the protrusions 24, 25 described above will therefore have no function as long as there is material remaining on the brake linings 14, 15 and the brake disc 3 is not worn down to a dimension less than a permitted minimum value. As long as these conditions are met, the lining discs 7, 9 will mainly be located in and moved within the range of extension of the normally load-bearing supporting surfaces 17-20, i.e., will not pass beyond the planes 23 shown in FIGS. 3 and 4 in a direction towards the brake disc 3.

If recommended service and maintenance are neglected to such a degree, that the brake linings are worn down and the brake disc 3 is at the same time worn down to a dimension less than a minimum tolerance, which case is illustrated in FIG. 4, the lining discs may fall outside of the load-bearing supporting surfaces 17-20. This is thus the case when, for example, the lining disc 9 as a whole, i.e., even with the entire backing plate 26, has moved so far to the right or left, respectively, in FIG. 4, that the brake pad will have passed the plane 23, which constitutes the limit of the range of extension of the load-bearing supporting surfaces. The openings 28, 29 for the protrusions 24, 25 extend however according to the invention beyond the respective limiting plane 23 of the load-bearing supporting surfaces. In the illustrated example, the brake disc 3 is bridged by at least the reserve supporting surface 30, as is shown schematically in FIGS. 3 and 4. This means that when the brake pads 7, 9 are no longer supported by the load-bearing supporting surfaces, the brake pads fall a small distance so that the edge portions 27 of the protrusions 24, 25 come to bear against the corresponding reserve supporting surface 30, which thereby takes over the role of a load-bearing supporting surface in this extreme case instead of falling out of the caliper as would be the case absent such protrusions.

A second embodiment of the arrangement according to the invention is shown in FIGS. 5 and 6 where the protrusions, which are designated by 31, are not directed at an angle to the edge surfaces 21 of the brake pad, but rather extend straight upwards in FIG. 5 and into respective openings in the caliper 2. Even in this case each brake pad 9, 7 is preferably provided with two protrusions, of which FIG. 5 however shows only one. In this second embodiment, the angled edge surface portion 27 is however replaced by a locking pin 32, which is common to and joins the brake pads 7, 9 located on either side of the brake disc 3 (see FIG. 6). The locking pin 32 is pushed through openings in each of the two lining discs and seats against the reserve supporting surfaces 35, 39 which are formed in the caliper as counter sunk portions thereof. A spring plate 36 which is secured in the caliper contacts the two ear-like protrusions 31 and reduces shaking and vibrations in the brake pads. As is seen in FIG. 5 some play is preferably provided in this exemplifying embodiment as well between the periphery of the locking pin 32 and the reserve supporting surface 35 under normal conditions. The locking pin and the reserve supporting surface 35 are brought into operation only under the above described conditions due to neglect of the disc brake, when the brake linings fall outside of their limiting plane 23 according to FIG. 4, and no longer are supported by the ordinary load-bearing supporting surfaces. The brake pads are thus prevented from falling out. The greatest forces are however tangentially directed and are absorbed by an edge portion 37 of the protrusions coming to bear against a bearing surface 38 in the openings. This bearing surface thus forms an additional reserve supporting surface for the brake pads.

The invention is not limited to the exemplifying embodiments described above and shown in the diagrams, but may be varied in many ways within the scope of the following patent claims. The protrusions may for example have a different shape, but will in and of themselves be shaped or provided with elements in such a way, that the surfaces in the protrusions or the corresponding elements will come to bear against surfaces in the caliper or the caliper holder and thereby in extreme cases, when ordinary load-bearing supporting surfaces are caused to cease to operate, may take over such operation in order to prevent the brake pads from falling out of the brake caliper, thereby leading to total brake failure.

Claims:

1. A disc brake comprising a brake disc having first and second braking surfaces and being rotatable about a predetermined axis of rotation, caliper holding means, at least one brake caliper slidably mounted with respect to said caliper holding means, said at least one brake caliper being slidable in a direction substantially parallel to said predetermined axis of rotation and carrying first and second brake pads disposed adjacent to said first and second braking surfaces of said brake disc, said first and second brake pads including friction lining means for bearing against said first and second braking surfaces, means for moving said at least one brake caliper with respect to said caliper holding means for exerting pressure on said first and second brake pads against said first and second braking surfaces during braking, said first and second braking pads being disposed within an axially extending space defined by said caliper holding means, primary support surface means within said axially extending space for supporting said first and second brake pads in their normal desired radial position with respect to said brake disc, said primary support surface means extending axially towards said first and second braking surfaces to first predetermined locations spaced from said first and second braking surfaces so as to define a pair of predetermined planes parallel to said brake disc whereby when said first and second brake pads become worn to a predetermined extent said first and second brake pads become disposed inwardly toward said first and second braking surfaces so as to pass within said predetermined plane and are therefore free to fall radially inwardly from said caliper holding means, secondary support surface means associated with said caliper holding means and defining a pair of openings, said secondary support surface means extending axially towards said first and second braking surfaces and bridging said brake disc, said first and second brake pads including first and second protrusions extending into said pair of openings whereby when said first and second brake pads are int he normal desired radial position said first and second brake pads do not maintain any load bearing contact with said secondary support surface means and when said first and second brake pads become worn to said predetermined extent said first and second protrusions come into contact with said secondary support surface means so as to provide load bearing contact for said first and second brake pads.

2. The disc brake of claim 1 wherein said first and second protrusions include edge portions facing said secondary support surface means.

3. The disc brake of claim 2 wherein said edge portions mutually diverge indirections radially outwardly from said predetermined axis of rotation.

4. The disc brake of claim 1 wherein said pair of openings are provided between said at least one caliper holder and said caliper holding means.

* * * * *

UNITED STATES PATENT AND TRADEMARK OFFICE
CERTIFICATE OF CORRECTION

PATENT NO. : 5,083,641
DATED : January 28, 1992
INVENTOR(S) : Gunnar Kleiva

It is certified that error appears in the above-identified patent and that said Letters Patent is hereby corrected as shown below:

Column 2, line 13, "peripheraly" should read --peripherally--.
line 18, delete "," following "a".
Column 6, line 24, delete "int he" and insert therefor --in the--.
line 37, delete "indirections" and insert therefor --in directions--.

Signed and Sealed this

Twenty-seventh Day of April, 1993

Attest:

MICHAEL K. KIRK

*Attesting Officer*  *Acting Commissioner of Patents and Trademarks*